US008299936B2

(12) United States Patent
Papadopoulos

(10) Patent No.: US 8,299,936 B2
(45) Date of Patent: Oct. 30, 2012

(54) METHOD AND APPARATUS FOR ESTABLISHING LOW FREQUENCY/ULTRA LOW FREQUENCY AND VERY LOW FREQUENCY COMMUNICATIONS

(75) Inventor: Konstantinos Papadopoulos, Chevy Chase, MD (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 469 days.

(21) Appl. No.: 12/638,399

(22) Filed: Dec. 15, 2009

(65) Prior Publication Data

US 2010/0164747 A1 Jul. 1, 2010

Related U.S. Application Data

(60) Provisional application No. 61/138,746, filed on Dec. 18, 2008.

(51) Int. Cl.
*H04B 13/02* (2006.01)

(52) U.S. Cl. .................. 340/850; 340/539.1; 340/870.1; 340/852; 342/127; 342/453; 342/457; 324/330; 324/329; 324/337; 324/389; 324/118

(58) Field of Classification Search .................. 340/850, 340/539.1, 870.1, 852; 342/127, 453, 457; 324/330, 329, 337, 344, 389, 118, 357, 365, 324/350, 367, 372
See application file for complete search history.

(56) References Cited

U.S. PATENT DOCUMENTS 5,038,406 A * 8/1991 Titterton et al. .............. 398/125
5,361,029 A * 11/1994 Rider et al. .................... 324/326
5,777,476 A * 7/1998 Papadopoulos ............... 324/334
6,466,021 B1 * 10/2002 MacEnany .................... 324/350
6,549,012 B2 * 4/2003 Stolarczyk .................... 324/337
6,972,690 B1 * 12/2005 Schaefer ....................... 340/850
7,197,381 B2 * 3/2007 Sheikh et al. .................... 701/13
7,759,941 B2 * 7/2010 Bosnar .......................... 324/337
7,812,611 B2 * 10/2010 Johnstad et al. .............. 324/365
8,115,622 B2 * 2/2012 Stolarczyk et al. ...... 340/539.13
2005/0241710 A1 * 11/2005 Early et al. ...................... 138/89
2009/0267608 A1 * 10/2009 Johnstad et al. .............. 324/337

* cited by examiner

*Primary Examiner* — Lam T Mai
(74) *Attorney, Agent, or Firm* — Daniel J. Long

(57) ABSTRACT

A method for generating electromagnetic waves in the ELF/ULF comprising the steps of using a ground-based Horizontal Electric Dipole (HED) antenna to send electromagnetic pulses upwardly in the E-region of the ionosphere to form an oscillatory or pulsed electric field; allowing said pulsed electric field to interact with magnetized plasma of the lower ionosphere to generate a pulsed horizontal and vertical current which have associated Horizontal and Vertical Electric Dipole moment; and allowing them to radiate.

27 Claims, 17 Drawing Sheets

Fig. 2A
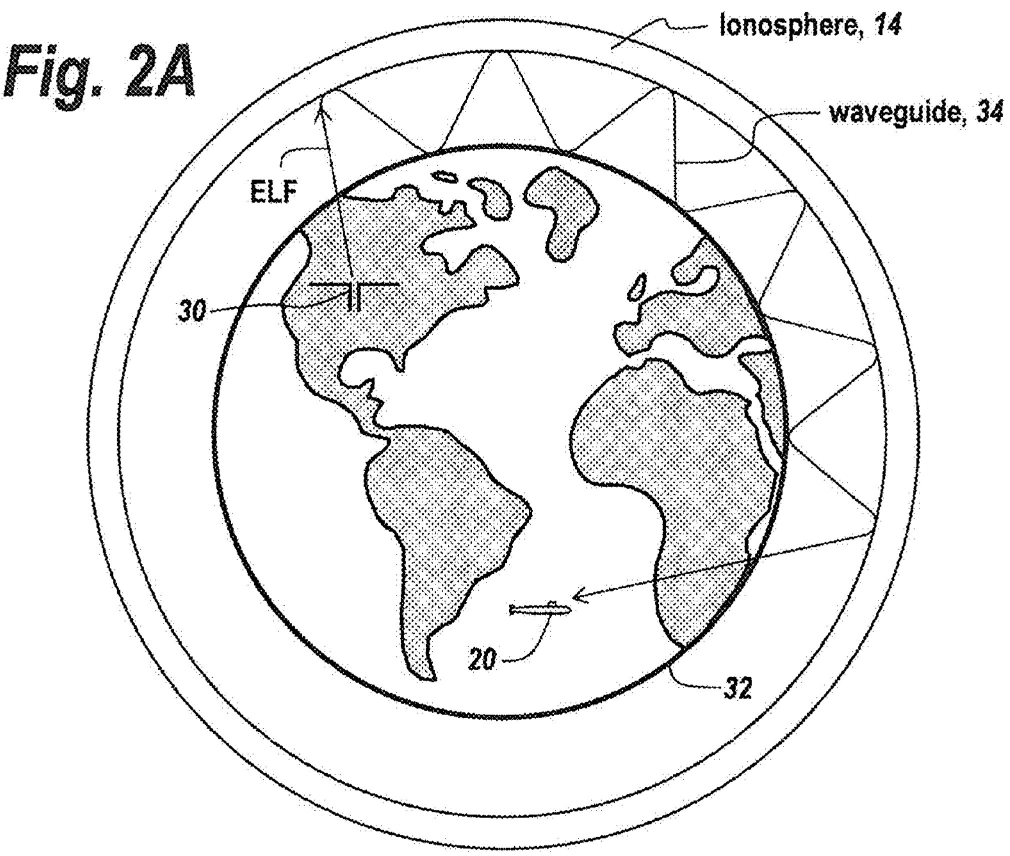
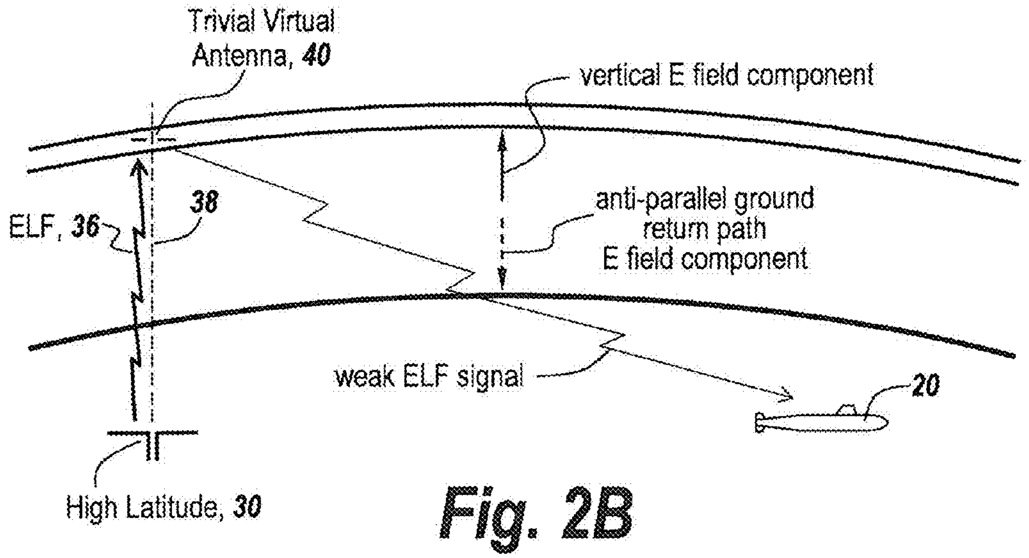
Fig. 2B

E field in the ionosphere due to antenna current only

E field in the ionosphere due to ground current only

Total E field in the ionosphere for skin depth of 1 km

Ionospheric conductivity profiles for daytime equatorial latitudes.
Notice sharp gradient in the Hall conductivity between 90 and 130 km.

Coordinate system that describes the E-region configuration

Ionospheric conductance vs. geomagnetic latitudes. Only sites with geomagnetic latitude below 20 degrees will give enhancement of HED power injection at ELF frequencies. Optimal location appears to be one degree.

Relative amplitude and shape of the horizontal electric field using a HED and Sneak-Through. Notice that the cancellation due to the return current is only 0.6 rather than more than two orders of magnitude ($L/z_0$) factor.

Ground response time as function of antenna length L and ground conductivity between 0.001 and 4 S/m.

METHOD AND APPARATUS FOR ESTABLISHING LOW FREQUENCY/ULTRA LOW FREQUENCY AND VERY LOW FREQUENCY COMMUNICATIONS

RELATED APPLICATIONS

This Application claims rights under 35 USC §119(e) from U.S. Application Ser. No. 61/138,746 filed Dec. 18, 2008, the contents of which are incorporated herein by reference.

FIELD OF THE INVENTION

This invention relates to the transmission of extremely low frequency signals and more particularly to a method and system for establishing reliable communications at these frequencies.

BACKGROUND OF THE INVENTION

For many years the ability to communicate at frequencies at for instance between 10 Hz and 1000 Hz has been important primarily for communication with submarines in which extremely low 10 Hz-2000 Hz signals are required to penetrate to the ocean depths or, for instance for finding underwater objects or doing underground exploration.

There is a problem with ground antennas for ELF/ULF communication in that conventional antennas are very inefficient because while they project energy into free space, they also drive a return current of equal intensity inside the ground. The return current radiates an E field that partially cancels the E field in both the submarine receiver as well as in the ionosphere above the ELF transmitter. As a result the received signal strength is weaker by the effect of the ground return currents. The result in terms of radiated power is that radiated signals are 40 dB or more below that which could occur if one did not ground the return problem.

In the past in order to establish extra low frequency, ultra low frequency or very low frequency communications, it has been found that by projecting high frequency, HF signals into the ionosphere the HF signal is converted by an electrojet current created by the solar wind into an ELF/ULF signal which for instance is capable of penetrating below the surface of the ocean to a depth for instance of 500 feet or more.

The HAARP project, or the High Frequency Active Auroral Research Program, was instigated to investigate how the ionospheric layers could be affected or in fact activated utilizing High-Frequency (HF) electromagnetic waves in the 2.8-10 MHz range produced by a ground-based transmitter.

The initial theory for providing low frequency communication was to in essence create a virtual ELF antenna in the lower ionosphere. To provide such a radiating capability so-called electrojets were utilized. These electrojets are electric currents that run horizontally in the ionosphere and are created by the interaction of the solar wind with the earth's magnetosphere. When HF signals modulated at the desired ELF frequency interact with the electrojet a virtual antenna is generated at the modulated frequency, essentially down-converting to the HF to ELF frequency. The down converted energy propagates in a wave guide established between the ionosphere and ground.

While the injection of HF energy into the ionosphere when interacting with an electrojet produces a significant amount of low frequency energy, the electrojet is not present all the time. One can go to three to five days without having any electrojet current. Moreover, even when the electrojet exists, the distance from where one wants to send signals to the point of receipt is on the order of 4 to 5 mega meters or approximately 3000 miles, and one can lose 20 to 30 dB in received signal strength simply by virtue of the distance and attenuation involved.

Thus in the HAARP scenario, one sends amplitude modulated radio-waves towards the ionosphere. The radio-waves modulate the conductivity of the ionospheric plasma by periodically heating the ionospheric electrons and thus creating an oscillatory current. It is this current that radiates in the low frequency domain sufficiently to provide subsurface communications.

Prior to the HAARP experiments, the only technique to communicate with subsurface vessels such as submarines was to utilize extra low frequencies, for instance at 76 hertz and to project these electric fields into a wave guide formed by the ionosphere and the surface of the earth. These types of communication were provided by a NAVY communications facility in the state of Michigan. At a frequency of 76 hertz the wavelength corresponds to 4000 kilometers. It is noted that the efficiency of an antenna is inversely proportional to the wavelength, and with these wavelengths the antenna is totally inefficient. While the NAVY facilities in Michigan did not employ 4000 kilometer antennas, they did deploy antennas of about 50 kilometers.

These shortened antennas further complicated the efficient transfer of energy to a subsurface vessel and because of the lack of signal strength it was common practice to order the submarines to the surface so that they could receive signals. Typically it would take more than ten minutes to tell a submarine to surface and prepare to receive signals at a different frequency (e.g. 20 kHz) which engendered discovery of their location.

Thus there is a requirement to be able to reliably communicate with subsurface vessels or to detect subterranean objects and to provide a system which is all-weather and does not rely on the vagaries of solar wind.

As mentioned before, the problem with low frequency signals is the effect of ground loop cancellation.

The HAARP project was originally designed to reduce the effect of ground currents by lifting up the antenna above the ground. The result is that since the ground loop current effect is proportional to distance of the antenna from the ground, the further up that one can provide a virtual antenna, the less affected it will be by the ground currents. Noting that the ionosphere starts at 80 kilometers, the ability to provide the aforementioned electrojet based antennas was effective to substantially reduce the effect of the ground currents.

However, since electrojets generated by the solar wind are unreliable one was faced with having to solve the low frequency communications problem in another way.

SUMMARY OF INVENTION

Noting that the prior 76 hertz very low frequency transmissions were created by antennas in high geomagnetic latitudes of which Michigan is a part, in the subject invention the low frequency transmitting apparatus is moved to the magnetic equator. The result of moving the transmitting apparatus to the magnetic equator is a 25 to 30 dB gain that translates into 100-1000 times the power than was achievable when transmitting apparatus is located in the northern latitudes.

To understand the reason for this efficiency increase we should review briefly the basic physics of ELF antenna radiation including the effect of the currents that are created in the lower ionosphere above the ELF transmitter whose effect has not been considered previously, probably because they do not contribute to any significant effect, unless as claimed here the ELF antenna is located geomagnetic latitudes lower than 15-20 degrees. In addition to the ELF signal generated directly by the antenna current and its ground return, the ground-based ELF antenna generates a virtual antenna in the lower ionosphere at its radiating frequency. The strength of the virtual antenna is proportional to the conductance of the ionosphere and to the electric field generated above the ground-based antenna by the antenna current and its ground return. Notice that an equatorially based ELF antenna generates the same electric field strength in the ionosphere as the one located at high geomagnetic latitude.

This 25 to 30 dB improvement in signal strength has been found to be due to the fact that in the magnetic equatorial regions the magnetic field direction is parallel to the surface of the earth, whereas in the high geomagnetic latitude regions, the magnetic field is very oblique or even perpendicular to the surface of the earth One result of the magnetic field being parallel to the surface of the earth at the magnetic equator is the fact that the conductance in the ionosphere, namely $\Sigma$, is equal to 500 Siemens in the magnetic equatorial region, whereas the conductance goes down to 5.0 Siemens in the higher latitudes. This increase in conductance of two orders of magnitude explains the 25 to 30 dB improvement in signal strength when locating a low frequency transmitter on the magnetic equator since the strength of the virtual antenna becomes larger than that of the ELF antenna and its ground return.

The 25 to 30 dB signal strength improvement means that for instance submarines need not surface in order to receive communications from a land based source. It also means that subsurface and subterranean object detection through ultra low frequency or extremely low frequency signals is now available, where heretofore it was only sporadically available with the HAARP technology and only for sites close to auroral latitudes.

A further improvement in the signal strength for ELF signals emitted by transmitting apparatus at the magnetic equator involves pulsing of the transmitted signal. It is noted that the electric signal propagating through the ground and generated by the return current has a much lower speed than the speed of light at which the signal generated by the antenna current propagates towards the ionosphere. As a second part of the subject invention and to provide an additional 15 to 20 dB of signal strength improvement, it has been found that if one has a pulse length shorter than the time at which one would expect to receive the anti-parallel E field associated with the leading edge of a corresponding ground return pulse in the ionosphere, then the anti-parallel ground return pulse field will not affect or cancel the electric field in the ionosphere. Furthermore the virtual antenna at the equator has in addition to the horizontal current a vertical current that contributes significantly to the received signal.

Thus the two factors which reduce the effect of the ground return current, namely locating the transmitting apparatus at the magnetic equator and pulsing the signals such that the length of the pulse is less than the delay between the time that the pulse is emitted and the time that the ground return pulse is expected, further eliminates the effect of the ground return current and permits the robust extra low frequency communications.

As will be seen hereinafter, the ground return pulse delay, T, is determined by the length of the antenna L, and the conductivity of the ground.

Thus for any given length antenna and a given ground conductivity, one can determine the maximum pulse length of the radiated energy.

In summary, a system has been provided to generate robust extremely low frequency/ultra low frequency communications first by locating transmitting apparatus at or near the magnetic equator; and secondly by emitting pulsed radiation from this equatorial location having a pulse length less than the delay associated with the ground return current due to its slower propagation through the ground.

The subject invention relates not only to low frequency communications with subsurface vessels, it also relates to subsurface imaging whether the imaging be aquatic subsurface object detection or detection of images of subterranean objects.

BRIEF DESCRIPTION OF THE DRAWINGS

These and other features of the subject invention will be better understood in connection with the Detailed Description, in conjunction with the Drawings, of which:

FIG. 2A is a diagrammatic illustration of the prior art utilization of a ELF signal from an auroral location which propagates up to the ionosphere and back to the surface of the earth, with the ionosphere and the surface of the earth forming a wave guide through which the energy propagates until it reaches a receiver on the earth;

FIG. 2B is a diagrammatic illustration of the effect of ground return currents on the vertical E field component of energy propagating in space in terms of the anti-parallel ground return current E field component which tends to cancel the vertical E field component, thus resulting in a weak ELF signal;

DETAILED DESCRIPTION

Figure 1A:
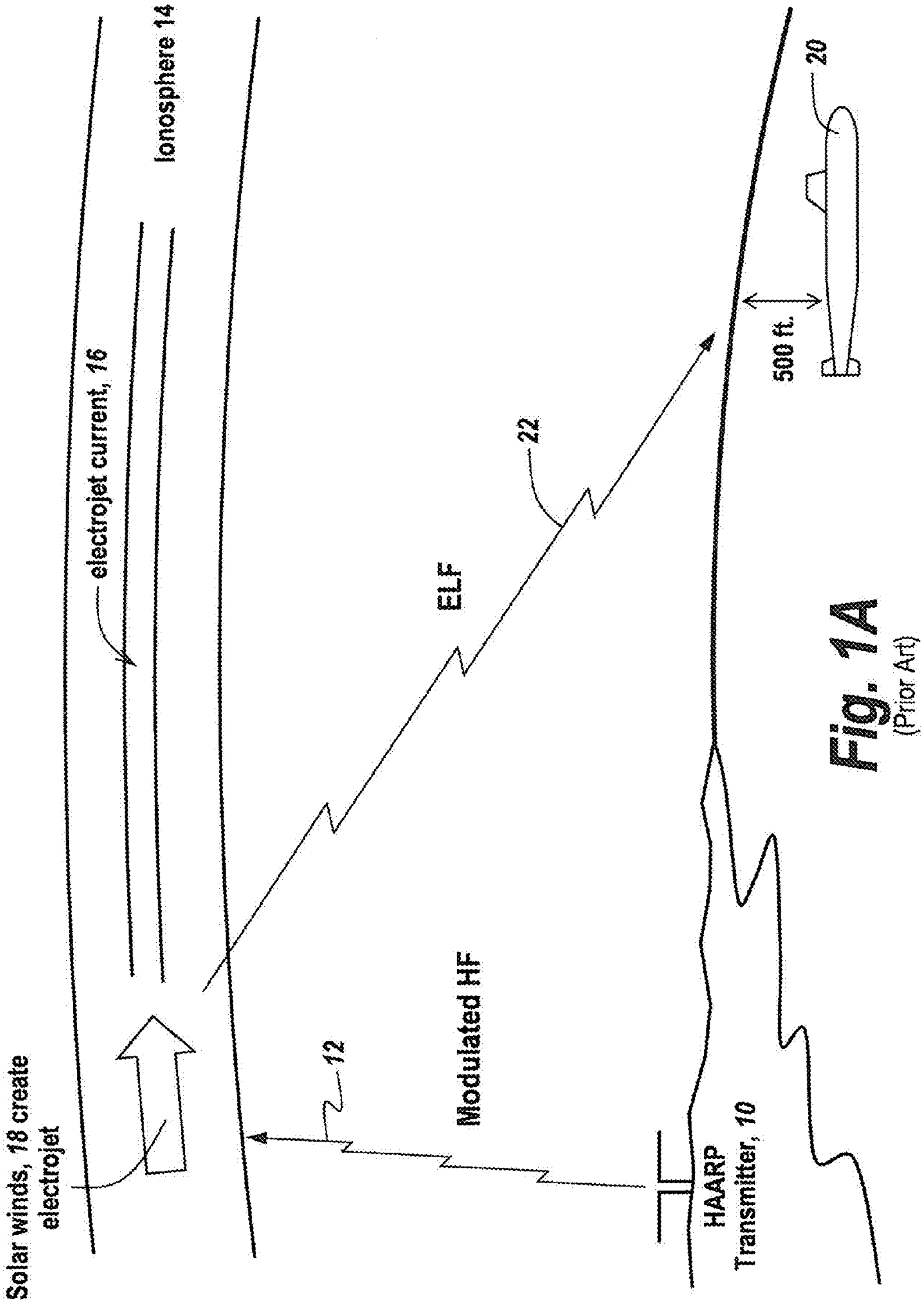
Fig. 1A (Prior Art)
FIG. 1A is a diagrammatic illustration of the conversion of a modulated HF signal to an ELF/ULF signal through interaction with an electrojet current produced or created by solar wind that enables communication with subsurface vessels.

Referring now to FIG. 1, in the prior art and as described above, a HAARP transmitter 10 radiated an HF ELF-modulated signal 12 into the ionosphere 14 where it interacted with an electrojet current 16 that is created by solar winds 18.

When the HAARP transmitter is modulated with ELF modulation, an ELF signal is radiated from the virtual antenna provided by the electrojet current into the free space beneath the ionosphere where it is detected for instance by a submerged submarine 20 that may for instance be 500 feet below the surface of the ocean.

Figure 1B:
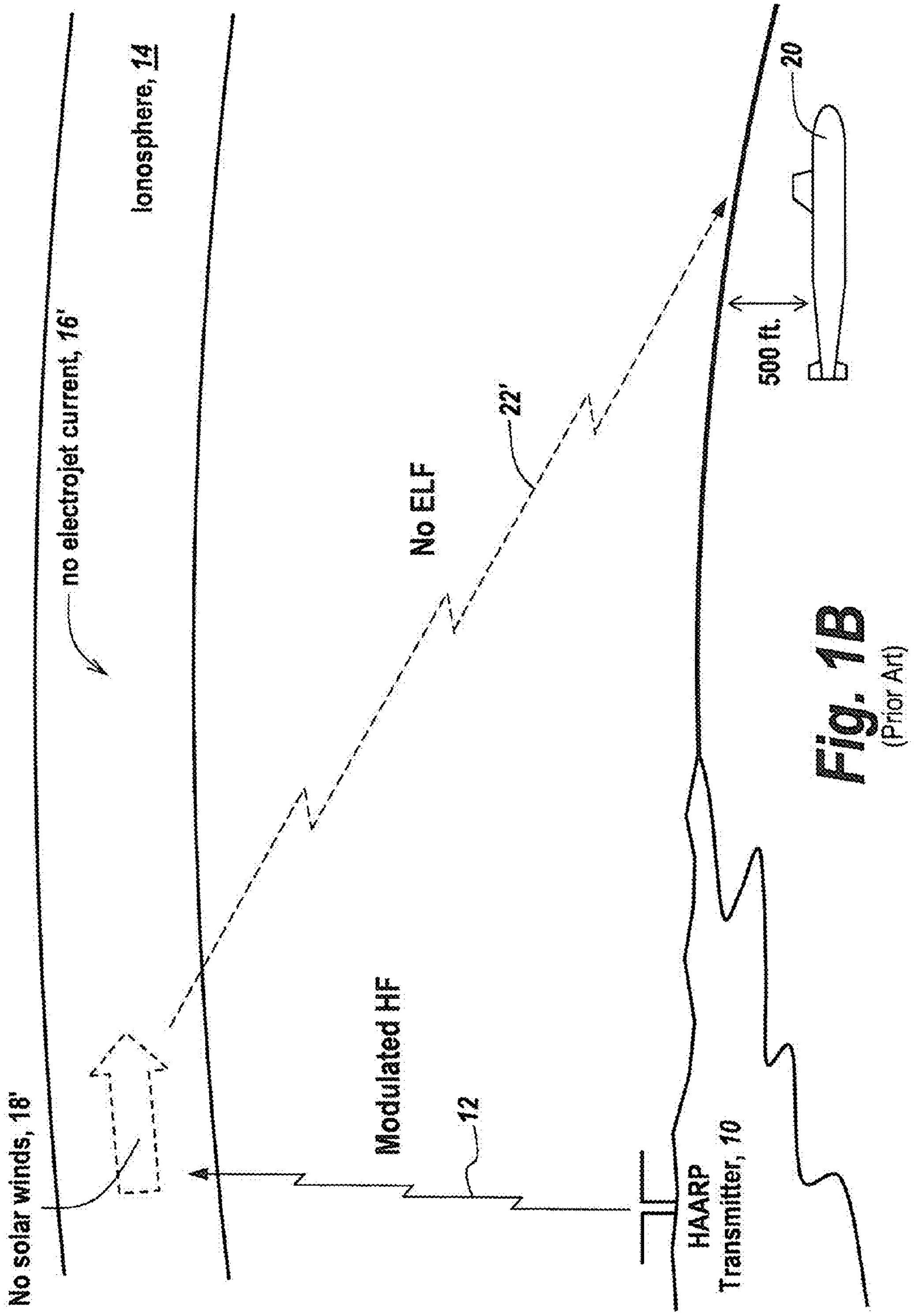
Fig. 1B (Prior Art)
FIG. 1B is a diagrammatic illustration of the effect of the lack of solar wind and the non-existence of an electrojet which precludes ELF/ULF energy to propagate towards the earth and a subsurface object thereon.

The problem with such a communications scheme is that, as illustrated at FIG. 1B, when there are no effective solar winds 18' there is no electrojet current 16' generated in ionosphere 14. This in turn means that there will be no ELF transmission as illustrated at 22' and therefore no effective sub-sea communication.

Referring now to FIG. 2A, prior to the use of the HAARP technique, underwater communications were established using ELF frequencies directly and transmitting the ELF energy using an ELF transmitting antenna 30 in the upper latitudes. Energy from this antenna was reflected by ionosphere 12 such that between ionosphere 12 and the surface 32 of the earth one effectively has a wave guide 34. The waveguide is excited by both the antenna and its antiphased return current so that only a very weak signal reaches a submerged receiver, here on submarine 20.

The problem as mentioned above with such a communication scheme, and as illustrated in FIG. 2B, is that only weak ELF signals are received at submarine 20.

If, as illustrated in FIG. 2B antenna 30 is at a high latitude, meaning above 30° in latitude, then the ELF signal, here illustrated at 36 immediately above this antenna as illustrated by dotted line 38 produces a virtual antenna 40 immediately above the transmitting antenna.

It has been found however that this virtual antenna is trivial when the transmitting antenna is at a high latitude. As will be discussed, the reason that this virtual antenna is trivial is due to the fact that ionospheric conductance, Σ, is quite low above transmitting antennas in the high latitudes. The reason that the conductance is low at high latitudes is because of the orientation of the magnetic field at the poles, which is generally vertical. With a vertical magnetic field one creates a current which is orthogonal to the magnetic field and the current closes along the upward magnetic field lines.

The reason that Σ is reduced in the area immediately above a high latitude transmitting antenna is because the magnetic field is perpendicular to the ground, contrary to the situation at the magnetic equator where the magnetic field is parallel to the ground where vertical currents are prevented. Since with a high latitude antenna vertical currents are allowed, this vertical current restricts the magnitude of the horizontal currents. This is equivalent to saying that the ionospheric conductance is low. If horizontal currents are restricted any vertical antenna will be almost non-existent.

On the other hand when one provides a horizontal electric field from an antenna at the magnetic equator, the horizontal magnetic field prevents the flow of vertical currents which in turn enhances the flow of horizontal currents. This is equivalent to saying that the ionosphere has a high conductance.

The net effect of this is stated by the proposition that the conductance above an antenna at the higher latitudes is low and the conductance above an antenna at the equatorial latitudes is high. Thus as can be seen by FIG. 2B, for high latitude transmitting antennas, the virtual antenna will in fact be trivial due to the reduced ionospheric conductance.

Figure 3:
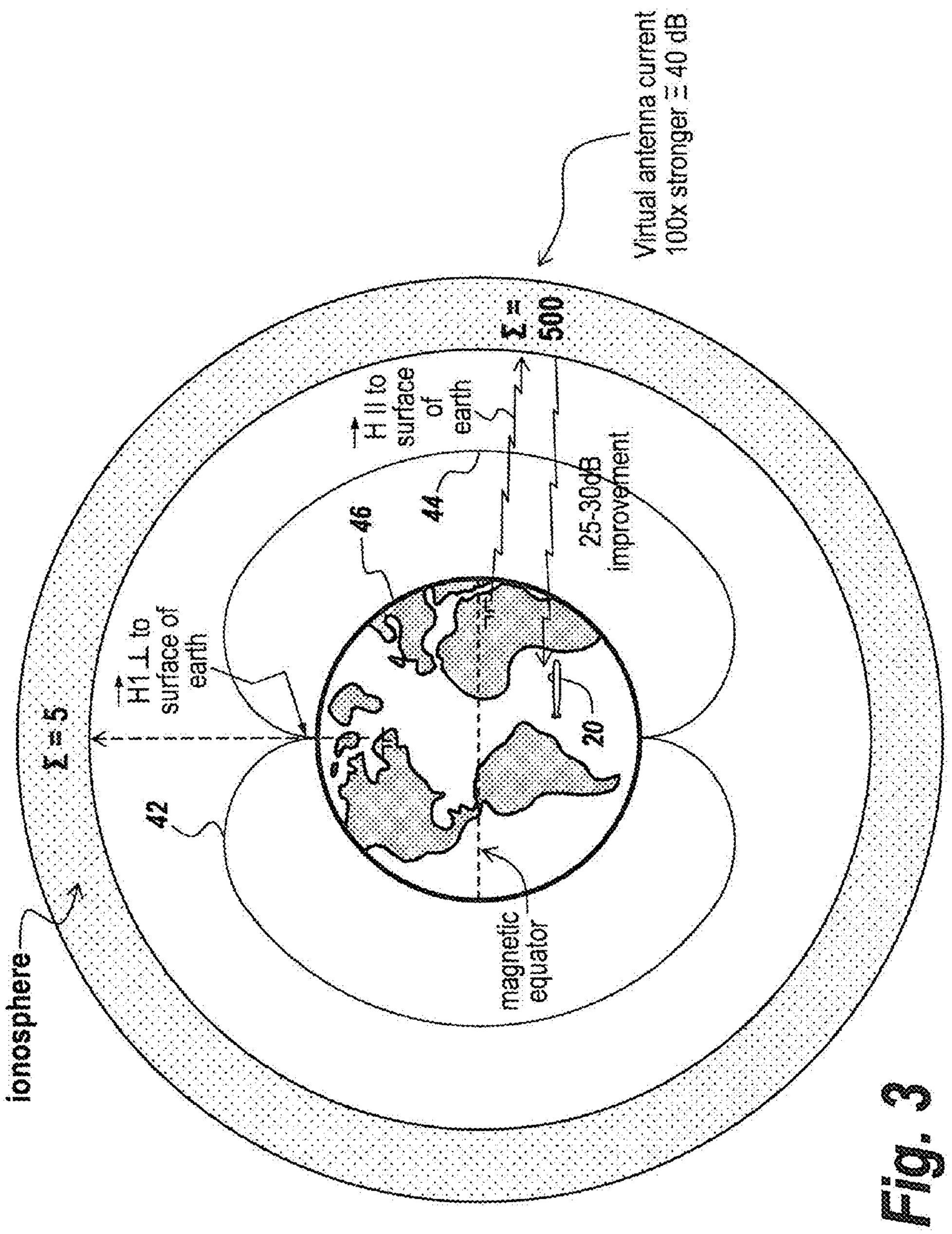
FIG. 3 is a diagrammatic illustration of the effect of locating transmitting apparatus on the magnetic equator in which the magnetic field is parallel to the surface of the earth as opposed to being perpendicular to the surface of the earth at the higher latitudes, also indicating a 25 to 30 dB improvement in signal strength due to the 100 fold increase in the conductance of the ionosphere in the magnetic equatorial regions.

This can be clearly seen from FIG. 3 in which at high latitudes the magnetic field lines 42 come in at the polar region perpendicular to the earth's surface, whereas the magnetic field direction 44 for an antenna at the magnetic equatorial region is parallel to the earth's surface. Here the earth's surface is designated by reference character 46. The result overall by locating an antenna at the magnetic equator is a 25 to 30 dB improvement in received signal strength, for instance at submarine 20.

Figure 4:
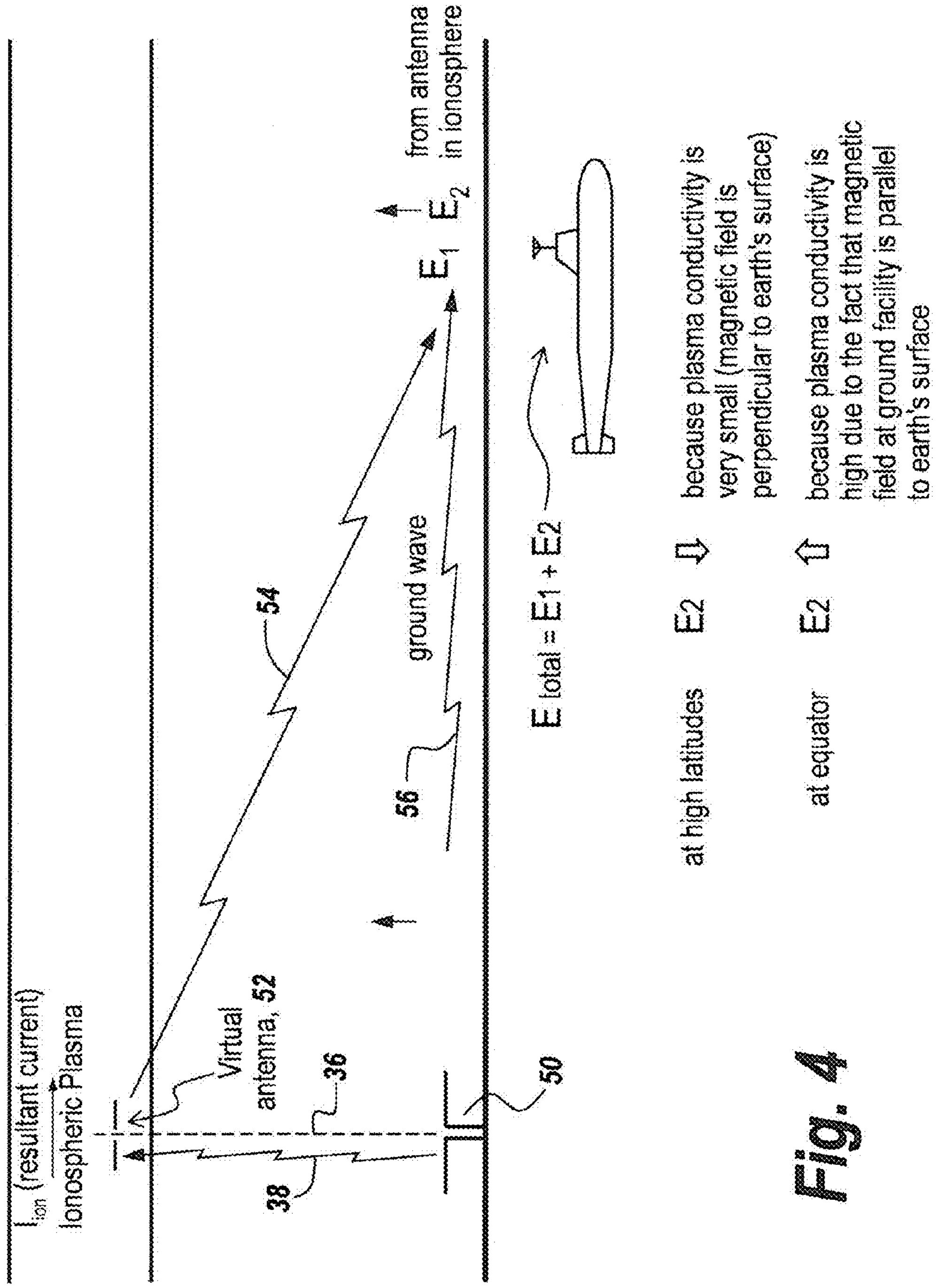
FIG. 4 is a diagrammatic illustration of the signal strength $E_2$ generated by the virtual antenna, which effects the energy, that is summed with the signal $E_1$ generated by the ground antenna, showing that because at high latitudes the plasma conductivity is the total field, it is not affected by the virtual antenna and is therefore limited by the return current, whereas at the equator because of the high plasma conductivity the virtual antenna signal dominates and the field due to the ground antenna and its return becomes irrelevant.

Referring now to FIG. 4 and put another way, assuming that one has a transmitting antenna 50 which produces a electromagnetic radiation 36 directly above the antenna in the direction of vertical 38, and assuming that one has created a virtual antenna 52, it will be seen that the ionospheric current, $I_{ion}$ which is the resultant current, produces a radiated signal 54 which when combined with the ground wave 56 produces a signal strength $E_{Total}=E_1+E_2$.

Here it can be seen that $E_l$ is the ground wave and $E_2$ is the sky wave. At high latitudes $E_2$ which is the sky wave signal is much smaller than that produced by the transmitting antennas at the equator because the plasma conductivity is very small when the magnetic field is perpendicular to the earth's surface.

On the hand, at the equator $E_2$ is much larger because the plasma conductivity is high due to the fact that the magnetic field at the ground facility is parallel to the earth's surface.

All of the above results in a 25 to 30 dB increase in signal strength at a receiver. This is significant because it allows the extremely low frequency signals that are capable of penetrating the ocean to have a high signal strength and a corresponding high information rate. This for instance allows one to transmit maps to a subsurface location.

While the location of the ELF transmitter at the magnetic equator produces a major communications benefit, pulsing the transmitted signal at the equator produces another 25 to 30 dB received signal improvement. How this is accomplished is now described in FIG. 5.

Figure 5:
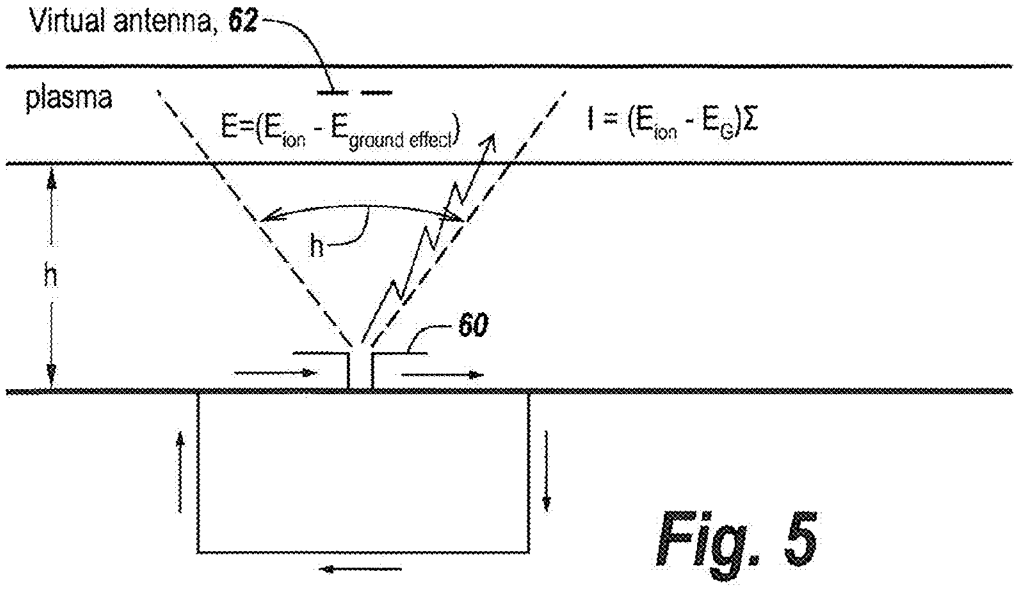
FIG. 5 is a diagrammatic illustration of the ground current loop path in which the horizontal electric field $E_{ion}$ in the ionosphere is reduced by the ground effect E field.

Referring to FIG. 5 the subject pulsing "sneak through" technique is explained. Here given an antenna 60 radiating upwardly with the plasma at a height h, virtual antenna 62 will be provided within a cone 62 which has an aperture approximately equal to the height of the ionosphere above the antenna. It is important here to note that the virtual antenna is created only directly above the transmitting antenna.

The horizontal currents in the virtual antenna are proportional to $E_{ion}$ and E where $E_g$ refers to the effect of having generated a ground return current when generating ELF energy at a ground station. The horizontal current in the plasma is equal to $(E_{ion}-E_g)\Sigma$. Thus the current in the plasma due to a radiation from antenna 60 is reduced by the so-called ground effect current.

Figure 6:
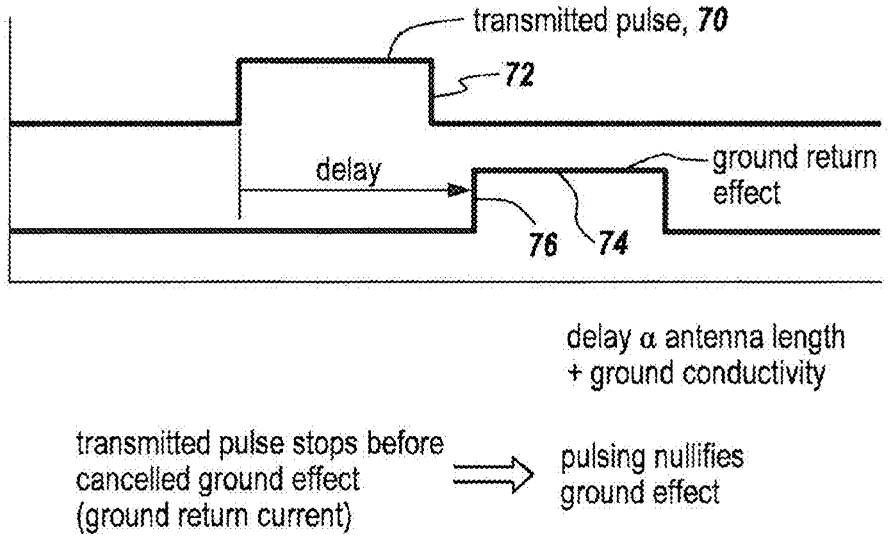
FIG. 6 is a diagrammatic illustration of the length of the transmitted pulse and the delay in the ground return pulse effect showing that by keeping the transmitted pulse length below the delay the ground return current effect can be even further minimized.

Referring to FIG. 6, it is possible to eliminate the effect of $E_g$ by pulsing the transmitted wave such that the trailing edge of the pulse stops the pulse before the onset of the ground return pulse. The ground return pulse arrival delay is due to the slow propagation of the ground return current in the ground which has a slower propagation velocity when compared to free space propagation at the speed of light.

Also as will be demonstrated, the delay of the ground return current is proportional to antenna length and ground conductivity. This being said, it is possible to calculate for any given length antenna and any given ground conductivity the delay of the onset of the ground return current and to configure the transmitted pulse to cease before the ground return pulse arrives. Here transmitted pulse 70 is illustrating as having a trailing edge 72 which occurs before the onset of the ground return pulse 74, as illustrated by leading edge 76.

The result is that for the equator, and $I=E_{ion}-E_g$, $E_{ion}$ is not diminished by the ground return because the ground return pulse arrives after the transmitted pulse has ceased. How this can be further explained can be seen in FIG. 7.

First and foremost it is important to note that the ground return currents are only problematic in very low frequency signals. For HF signals there is no significant penetration into the ground of these signals and therefore no significant ground currents are produced.

However, for extra low frequency signals a significant ground current is produced to a depth within the earth, called the skin depth.

Figure 7:
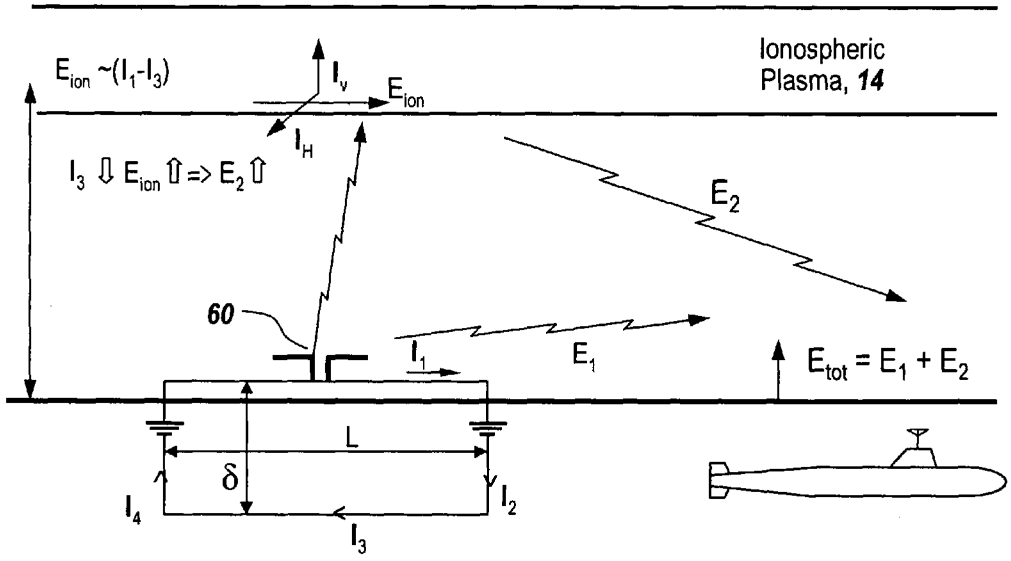
FIG. 7 is a diagrammatic illustration of the diminution of the ground return current effect utilizing a pulsed source and the sneak through effect.

With this in mind and referring now to FIG. 7, it can be seen that for an antenna 60 having a length L and a depth δ, a current $I_1$ is produced in the lateral direction which results in a downwardly pointed current $I_2$ in the earth, followed by a current $I_3$ in the earth in the opposite direction to $I_1$, followed by an upwardly pointed current $I_4$.

As can be seen in this diagram the ground wave $E_1$ is created by $I_2$ and anti-parallel $I_4$, with $I_4$ tending to cancel $I_2$. The result is a relatively weak ground wave.

On the other hand as to the sky wave, $I_{ion}$ is created by $I_1$ and $I_3$, with $I_3$ being anti-parallel to $I_1$. With $I_3$ present, the result is a relatively weak field in the ionosphere. The currents created in the ionosphere by a ground-based signal are denoted by $I_v$ and $I_h$ and the sky wave $E_2$ is created by $I_v$ and $I_h$. Noted that $I_v$ and $I_h$ are proportional to $E_{ion}$ and the ionopsheric conductance. It will therefore be appreciated that $I_v$ and $I_h$ are reduced to the extent of $I_3$. $I_3$, as has been explained, is the ground return current and to the extent that the ground return current can be eliminated, $E_{ion}$ is no longer reduced by the ground current.

As mentioned above, the pulsing technique described in FIG. 6 is referred to as a "sneak through" technique. For no sneak-through, for the same antenna the value of $E_h$, is the same at high and low latitudes, but E is much larger in the equator resulting in larger values of $I_v$ and $I_h$ that results in an increase in the magnitude of the sky wave signal $E_2$. On the other hand at high latitudes, $E_2$ is much less than $E_1$, while at the equator $E_2$ is much greater than $E_1$.

The net result absent "sneak through" is that the same antenna will radiate much more efficiently at the equator and thus increases in the signal strength are the result of locating the transmitting antenna at or near the magnetic equator of the earth.

Adding sneak through pulsing achieves even more signal strength. If one adds the aforementioned sneak-through pulsing technique, it will be appreciated that the sneak-through does not affect the response of $I_2$ and $I_4$. However, the sneak-through technique gets rid of the effect of $I_3$ in generating $E_{ion}$, which further increases $E_2$.

It will be noted the $I_3$ effect is delayed due to ground propagation so that it is effectively removed from $E_{ion}$ which is proportional to $I_1$-$I_3$, leaving $I_1$ intact. This means that $E_{ion}$ is not affected by the ground return effect.

Note the sneak through effect is operating both at high and low latitudes, but at high latitudes where Σ is low, the virtual antenna is so weak the sneak through enhancement is not as noticeable.

What is depicted in FIG. 7 is as follows:

$E_1$ is created by $I_2$ and $I_4$ anti-parallel=(relatively weak ground wave). $E_{ion}$ is created by $I_1$ and $I_3$ anti-parallel (relatively weak field in ionosphere). $E_2$ is created by $I_V$ and $I_H$. $I_V$ and $I_H$ are proportional to $E_{ion}$ and the ionosphere conductance Σ.

1. No sneakthrough: For the same antenna the value of $E_{ion}$ is the same at high and low latitudes but Σ is much larger in the equator resulting in large values of $I_V$ and $I_H$, $\rightarrow E_2\uparrow$. At high latitude $E_2 \ll E_i$ while at equator $E_2 \gg E$. The same antenna will radiate much more at the equator to increase the received signal strength.

2. Move to equator and add sneakthrough. Sneakthrough does not affect the response of $I_2$ and $I_4$. However it gets rid of the effect of $I_3$ in generating $E_{ion}$. This further increases $E_2$.

3. At equator the $I_3$ effect is delayed due to ground propagation so that it is effectively removed from $E_{ion}\ \alpha\ I_1$-$I_3$, leaving $I_1$ intact, so that $E_{ion}$ is not affected by ground return effect.

Figure 8:
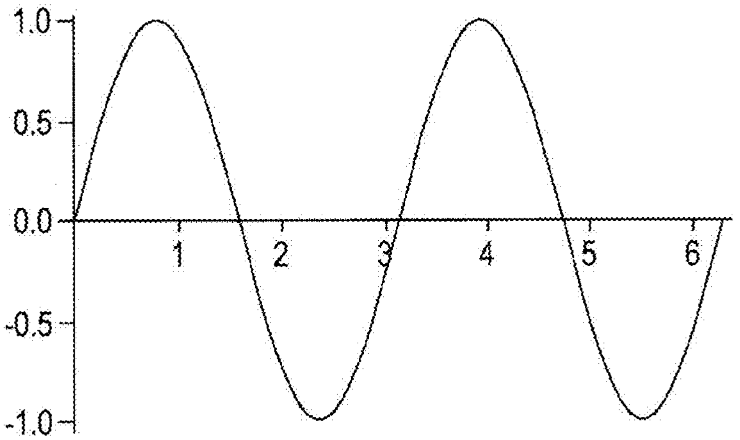
FIG. 8 is a graph of E field in the ionosphere due to antenna current only.
Figure 9:
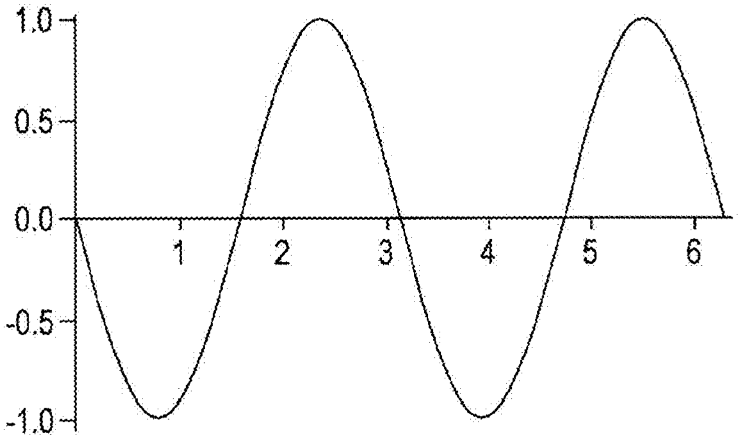
FIG. 9 is a graph showing E field in the ionosphere due to ground current only.

How sneak through can be representationally understood can be seen from FIGS. 8 and 9. What is shown in FIG. 8 is a graph of the E field in the ionosphere due to the antenna current only. It has a certain periodicity and therefore a certain frequency which in the subject example is some ELF frequency.

On the other hand referring to FIG. 9, the E field in the ionosphere due to the ground current only is shown. What can be seen is that there is an almost 180° phase reversal with respect to the two signals. The result is a significant cancellation of one signal by the other signal.

Figure 10:
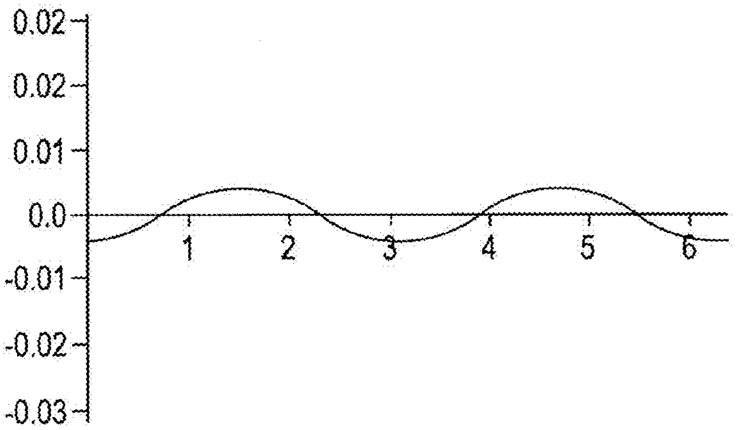
FIG. 10 is a total E field in the ionosphere for a skin depth of 1 kilometer.

Referring to FIG. 10, the result of this cancellation can be seen in terms of the absolute magnitude of the total E field in the ionosphere given for instance a skin depth of 1 kilometer. Thus it can be seen that if steps are not taken to eliminate the ground effect for extra low frequency signals, the resultant sky wave is dramatically reduced by the ground return effect by a factor of 80.

Figure 11:
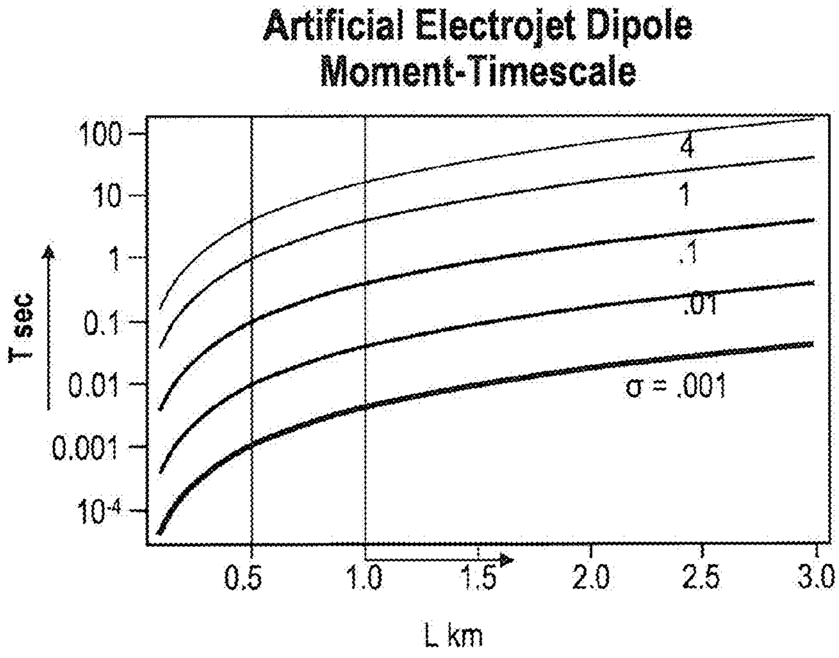
FIG. 11 is a graph showing artificial electrojet dipole moment-time scale.

What can be seen in terms of FIG. 11 is a graph illustrating the dependence of the ground delay, T, versus the length of the antenna L for different ground conductivities. For instance, the ground conductivity of seawater is 4 S/m, meaning that for a given length antenna of for instance 0.5 kilometers, the delay is approximately 3 seconds. This means that the pulse length must be less than 3 seconds.

On the other hand, for a ground conductivity of 0.01 S/m at an antenna length of approximately 0.5 kilometers, the delay is 10 milliseconds. What will be appreciated from this figure is that operating with high ground conductivities permits the transmission of relatively long pulses. For this reason it is important to note that having a towed antenna in the ocean is desirable because long pulses may be employed and because of the small required length of the antenna. What this means is that one can adequately radiate an ELF signal with a 100 meter long antenna immersed in seawater.

Figure 12:
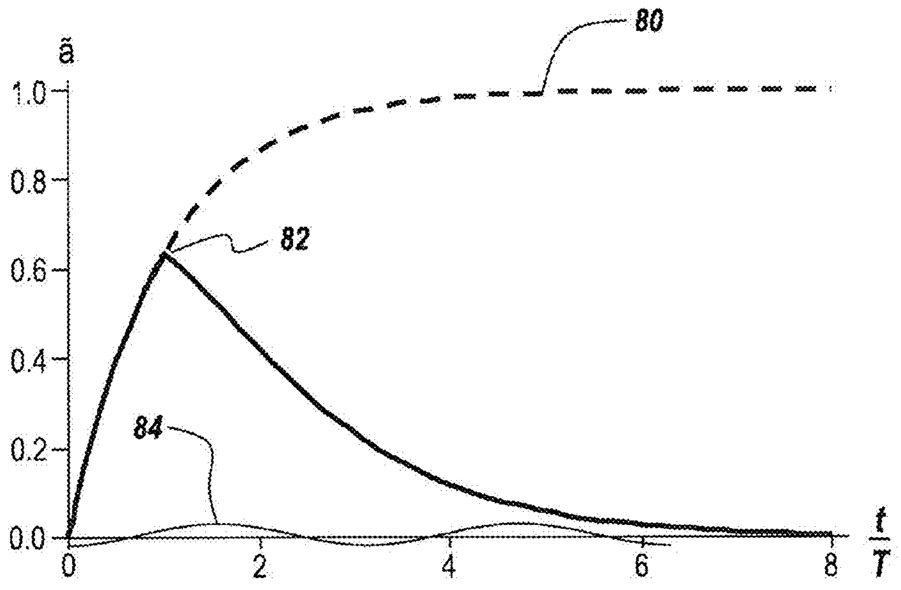
FIG. 12 is a graph of the amplitude of the electric field in the ionosphere versus time showing that the amplitude of the E field in the ionosphere is only down by 40% due to the sneak through technique resulting in a 20× gain improvement.

Referring to FIG. 12 assuming that a pulse is indicated by dotted line 80 with an amplitude of 1, the field in the ionosphere is only reduced by the ground return pulse to the extent that as illustrated at 82 the resultant electric field in the ionosphere is sixth tenths of what it would have been without the ground current effect. What can therefore be seen in relative amplitude terms is that if one were not able to cancel the ground current effect, one would have a relatively low amplitude signal as illustrated at 84, whereas if one were able to somehow eliminate the ground current effect as by the subject sneak-through technique, then one would have a significantly higher-amplitude sky wave signal.

Pulsed Artificially Created Electrojet (PACE)

1. Physics Background—Electrojets and the Cowling Effect

Figure 13:
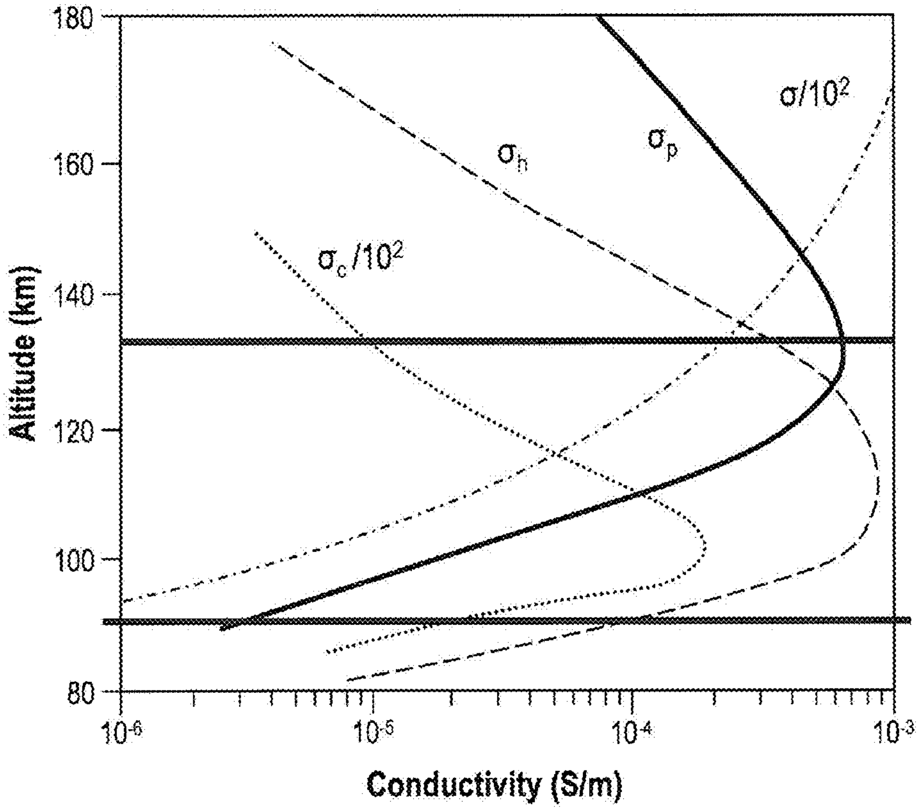
FIG. 13 is a graph of ionospheric conductivity profiles for daytime equatorial latitudes illustrating a sharp gradient in the Hall conductivity between 90 km and 130 km.

The PACE concept is best illustrated by considering the physics that creates electrojet currents. In a collision-less magneto-plasma the application of an electric field normal to the ambient magnetic field results in an $\vec{E}\times\vec{B}/B^2$ drift of the charged particles that is independent of the charge and mass of the particle, known as a plasma drift. As a result the application of the electric field results in a plasma drift but negligible current flow. The situation, however, is different in the low ionosphere because the ratio of the collision frequency to the cyclotron frequency ($v/\Omega$) of the electrons and ions varies with altitude. Below approximately 70 km altitude this ratio is larger than unity for both electrons and ions, so that a current flows in the direction of the electric (Pedersen current) carried by the highly mobile electrons. However, such a current is extremely small due to a low degree of ionization at such low heights. Above 130 km the opposite situation occurs resulting in a plasma drift but with little current despite the large plasma density. These effects are illustrated in FIG. 1 that shows the conductivities associated with equatorial daytime E-region. However, in the range between 70 and 130 km, the $v/\Omega$ ratio is large for the ions but small for the electrons. As a result the application of an electric normal to the ambient magnetic field results in only an electron drift (Hall current) while the ions are constrained by collisions with the ambient neutral gas. In all three regions an electric field parallel to the magnetic field drives a current along B. The parallel ionospheric conductivity is by more than four orders of magnitude greater than the transverse conductivity and the magnetic field lines can, for all practical purposes be considered as equipotential lines. These effects are illustrated in FIG. 13 that shows the conductivities associated with equatorial daytime E-region. Notice that at low altitudes the dominant conductivity is the Hall conductivity. It has maximum of approximately $10^{-3}$ S/m and dominates for altitudes up to approximately 130 km. This is the result of the altitude dependence of the electron density and of the plasma collisionality.

Figure 14:
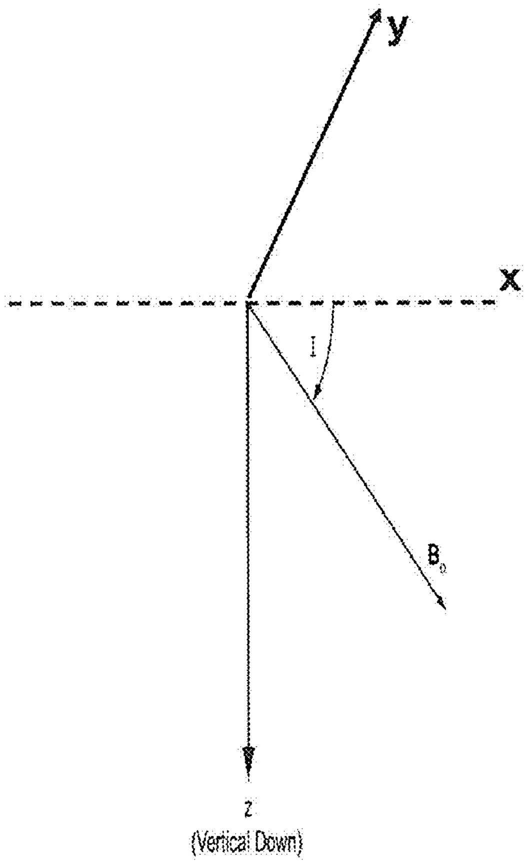
FIG. 14 is a graph showing a ground generated pulse horizontal electric field $E_x$ that drives a horizontal current pulse equal to $J_x$ and a vertical current pulse with current density $j_v$.

The above process explains the electrojets currents that flow in the high-latitude (auroral) and low latitude (equatorial) regions known as the auroral and equatorial electrojet. The creation of the electrojet currents can be understood by referring to FIG. 14 that illustrates a simplified magnetic geometry of the ionospheric E-region with the earth's magnetic field in the x-z plane and an angle I with respect to the vertical direction, known as the dip angle of the magnetic field. In the magnetic equator the dip angle is zero and the earth's magnetic field parallel to the ground, while in the auroral region the dip angle is 90 degrees and the earth's magnetic field perpendicular to the ground. The electrojets are created when an electric field in the y-direction, $E_y$, driven by solar effects is imposed on the ionospheric E-region. Such a field drives currents with current density $J_x$ in the x and $J_y$ in the y direction given by $$J_x=\sigma_{xy}E_y$$

$$J_y=\sigma_{yy}E_y \tag{1}$$

In Equation (1) $\sigma_{xy}$ and $\sigma_{yy}$ represent components of the ionospheric conductivity tensor and are given in terms of the values of the Pedersen ($\sigma_p$), Hall ($\sigma_h$) and parallel ($\sigma_{ii}$) whose values for the equator are shown in FIG. 13 by the following expressions $$\sigma_{xy}=-\frac{\sigma_{ii}\sigma_h\sin I}{\sigma_{ii}\sin^2 I+\sigma_p\cos^2 I} \tag{2}$$

$$\sigma_{yy}=\frac{\sigma_{ii}\sigma_h\sin^2 I+(\sigma_p^2+\sigma_h^2)\cos^2 I}{\sigma_{ii}\sin^2 I+\sigma_p\cos^2 I}$$

These tensor elements are known as the layer conductivities.

Near the magnetic poles the dip angle is I=90 degrees and the conductivity expressions reduce to $$\sigma_{xy}=\sigma_h$$

$$\sigma_{yy}=\sigma_p \tag{3}$$

These equations imply that the application of an electric field in the y-direction will create a Hall current perpendicular to the applied electric (in the x-direction) and a current along the direction of the applied field (Pedersen current).

In the magnetic equator the dip angle I=0 and Equations (2) give that $$\sigma_{xy}=0 \tag{4}$$

$$\sigma_{yy}=\sigma_p\left(1+\frac{\sigma_h^2}{\sigma_p^2}\right)\equiv\sigma_c.$$

The last equation defines the Cowling conductivity. Referring to FIG. 13 we note that the value of the Cowling conductivity is by two orders of magnitude larger than the Hall and Pedersen conductivities. This is the Cowling effects and implies that the application of an electric $E_y$ in the ionospheric E-region will result in a current two orders of magnitude larger in the dip equator than in the polar region.

The implications of Cowling effect can be best understood by referring to the value of the height-integrated current density $\vec{J}_s$ (A/m) defined as $$\vec{J}_S = \int \vec{J} dz \tag{5}$$

In Equation (5) the integration is performed over the lower E-region. From Equation (5) we find that the height integrated current density is related to the applied electric field by $$\vec{J}_S = \vec{\Sigma} \cdot \vec{\Sigma} \tag{6}$$

In Equation (6) $\vec{\Sigma}$ is the height integrated tensor with components given by $$\Sigma_{xy} = \int \sigma_{xy} dz$$

$$\Sigma_{yy} = \int \sigma_{yy} dz \tag{7}$$

Note that the units of Σ are Siemens (S). Table I lists the values of the components of the height integrated conductivity tensor as a function of the dip latitude as given by Matsuhita[2]. Notice the large values near the dip equator while for geomagnetic latitude higher than 15-20 degrees the values are very low. This implies that the same value of a horizontal electric dc or low frequency will create a current 100 times larger near the dip equator than near geomagnetic latitude above 40 degrees. This manifestation is a key to invention.

TABLE 1

| Dip Latitude (deg) | Σ (siemens) |
|---|---|
| 0 | 250 |
| 1 | 590 |
| 2 | 332 |
| 3 | 226 |
| 6 | 113 |
| 9 | 74 |
| 12 | 55 |
| 15 | 43 |
| 21 | 30 |
| 30 | 20 |
| 45 | 12 |
| 60 | 9 |
| 75 | 7 |
| 90 | 7 |

2. ELF Magnetic Field Generation Using Horizontal Electric Dipoles (HED)

Figure 15:
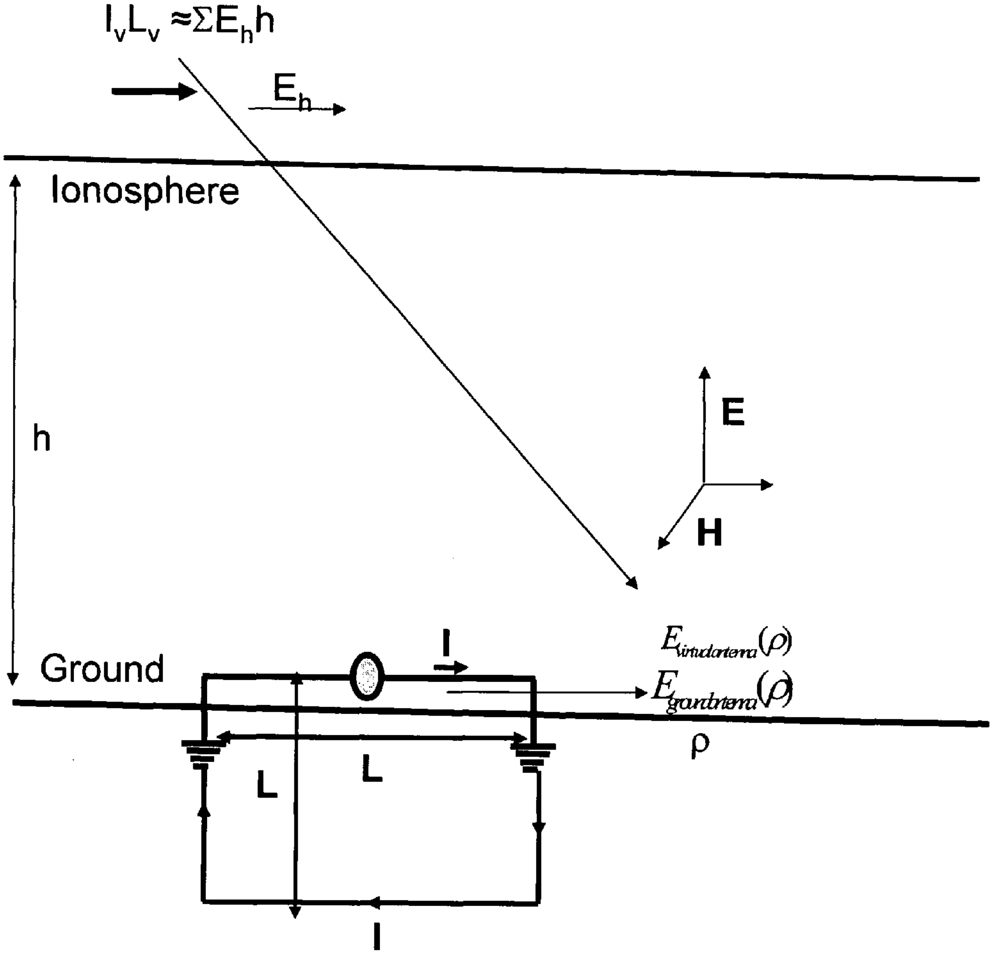
FIG. 15 is a diagrammatic illustration illustrating the HED of ELF/ULF waves in the EIW.

State of the art technology in generating magnetic fields in the ELF/ULF range, relies in ground-based HED (FIG. 15). What is shown in FIG. 15 is as follows:

HED excitation of ELF/ULF waves in the EIW. The TEM mode is excited by the difference of the two vertical currents each with moment IL that close the antenna current. Low efficiency since L much smaller than other scale lengths. In addition to the electric field generated by the HED antenna and its return there is an additional field generated by the virtual antenna created above the HED in the ionosphere by the near field horizontal $E_h$. Such antennas have been used in submarine communications at ELF frequencies. The electric field at a distance ρ created by a ground-based HED radiating at a frequency ω is given by $$E_{groundantenna}(\rho) \approx \left(\frac{Z_o}{2}\right)\left(\frac{IL}{h\sqrt{\lambda\rho}}\right)\alpha(\rho)(1/\eta_g) \tag{8}$$

$$\eta_g \approx (\sigma_g/\varepsilon_o\omega)^{1/2}$$

In Equation (7) $Z_o$ is the impedance of free space, h is the height of the ionosphere, α is the attenuation and $\sigma_g$ is the conductivity of the ground. The factor $(1/\eta_g)$ is due to the partial cancellation of the field radiated by the antenna by the anti-phased return current. It reduces the radiating efficiency of HED antennas by factors of the order of 40 dB or more, depending on the radiating frequency and ground conductivity. For example, for the Michigan ELF facility that radiates at a frequency of 76 Hz and has a ground conductivity $\sigma_g \approx 3\times10^{-4}$ S/m, the value of the ground refractive index $\eta_g \approx 265$ resulting in 50 dB reduction of the HED efficiency. This is an intrinsic deficiency of the HED antennas.

3. ELF Magnetic Field Generation Using the Artificial Constructed Electrojet (ACE) Concept The ACE concept is based on the following discoveries:

(i) Every HED antenna generates in the ionosphere above its location a virtual antenna by driving an ionospheric current. The ionospheric current is proportional to the value of the horizontal electric field $E_h$ generated by the HED at approximately 80 km and the value of the ionospheric conductance Σ.

(ii) The ground effect for the virtual antenna is smaller by a factor of δ/h, where δ is the ground skin depth, due to the fact that it is located at a height h above the ground.

(iii) The ionospheric conductance at locations near the dip equator is by a factor of 100 larger than the conductance at latitudes higher than 40 degrees. (notice that the geomagnetic latitude of upper Michigan is approximately 60 degrees).

These consequences of these discoveries is that in addition to the electric field of the ground HED and its return current given by Equation (8) there will be an electric field due to the virtual antenna given by $$E_{virtualantenna}(\rho) \approx \left(\frac{Z_o}{2}\right)\left(I_vL_v/h\sqrt{\lambda\rho}\right)\alpha(\rho)(1/\eta_g)\left(\frac{h}{\delta}\right) \approx \approx \left(\frac{Z_o}{2}\right)\left(I_vL_v/h\sqrt{\lambda\rho}\right)\alpha(\rho)\beta \tag{9}$$

$$\beta \equiv (1/\eta_g)(h/\delta) \approx .1(h/100\text{ km})(f/100\text{ Hz})$$

Notice that by lifting the antenna to 100 km the reduction factor due to the ground shielding becomes 0.1 rather than 0.004 given shown in Equation (8). The total electric field $E_{tot}$ at distance ρ will be the sum of the fields given by Equations (8) and (9) so that $$E_{tot}(\rho) \approx \left(\frac{Z_o}{2}\right)\left(IL/h\sqrt{\lambda\rho}\right)\alpha(\rho)(1/\eta_g)[1 + (I_vI_v/IL)(h/\delta)] \tag{10}$$

The second term in the bracket represents the enhancement due to the virtual antenna. If we define γ as $$\gamma \equiv (I_vL_v/IL)(h/\delta) \tag{11}$$

We see that the virtual antenna will give negligible contribution if γ<1, but will increase the efficiency of the HED when γ>1.

Figure 16:
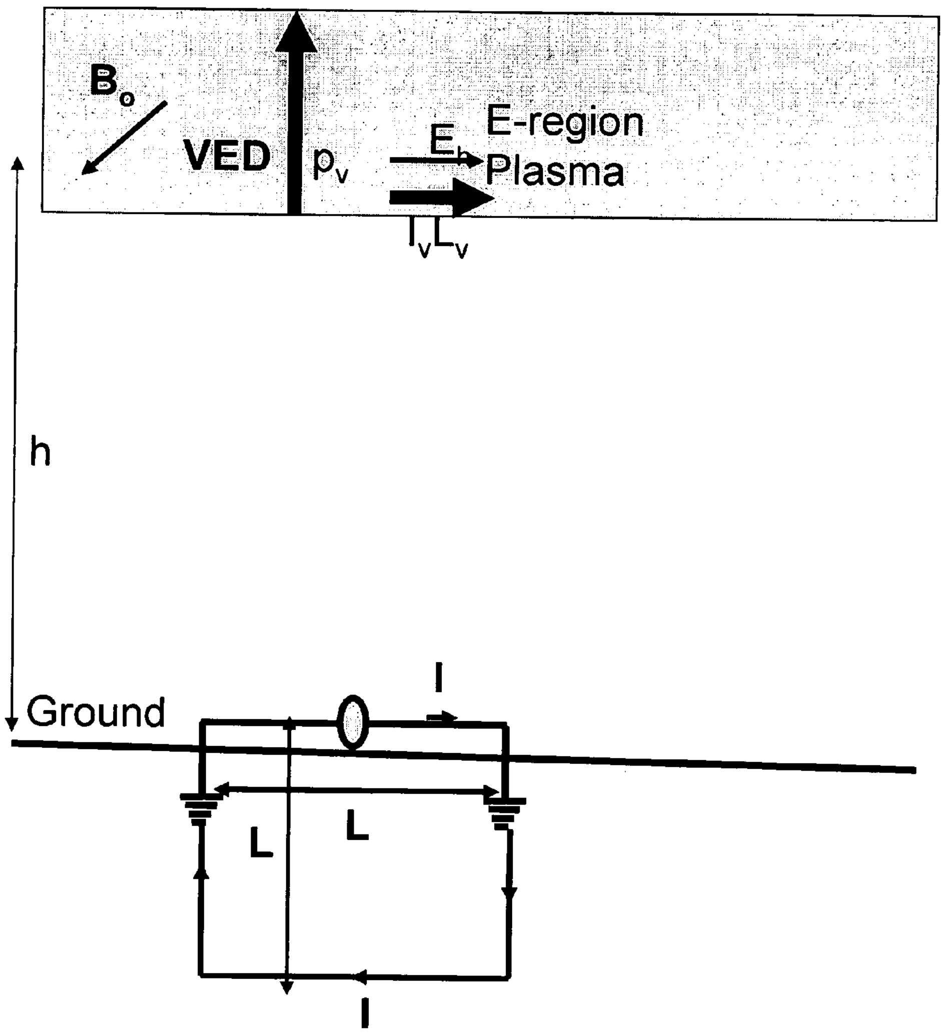
FIG. 16 is a diagrammatic illustration of HED excitation of near field magnetic and electric fields in the E-region driven by a sinusoidal current.

We next compute the value of $I_v L_v$ (FIGS. 15 and 16). For a dipole ground antenna $L_v$ is approximately the height h. The calculation below computes the current induced in the ionosphere by the electric field $E_h(h)$ driven by the ground antenna at the ionosphere assuming that the ionospheric conductance is Σ in units of Siemens.

$$I_v \approx E_h(h)\Sigma I_v \approx E(h)\Sigma h \qquad (12)$$
$$E_v(h) = \frac{IL}{4\pi\varepsilon_o ch^2}(\delta/h) \simeq \frac{IL}{30h^2}(\delta/h)$$
$$I_v \simeq (IL/h)(\Sigma/30)(\delta/h)$$

Since $L_v \equiv h$ we find that $$I_v L_v / IL \approx (\Sigma/30)(\delta/h) \qquad (13)$$

From Equations (11) and (13) we find that the enhancement factor γ is given by $$\gamma = (\Sigma/30S) \qquad (14)$$

Figure 17:
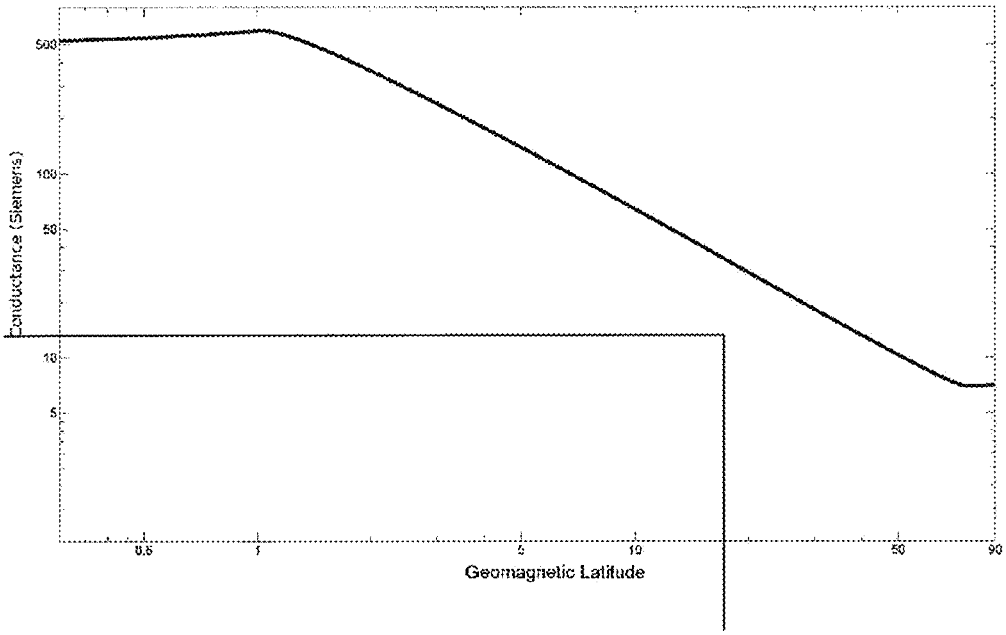
FIG. 17 is a graph showing the relative amplitude and shape of the horizontal electric field using a HED and the sneak through technique noting that the cancellation due to the return current is only 0.6 rather than more than two orders of magnitude for a non-pulsed signal.
Figure 18:
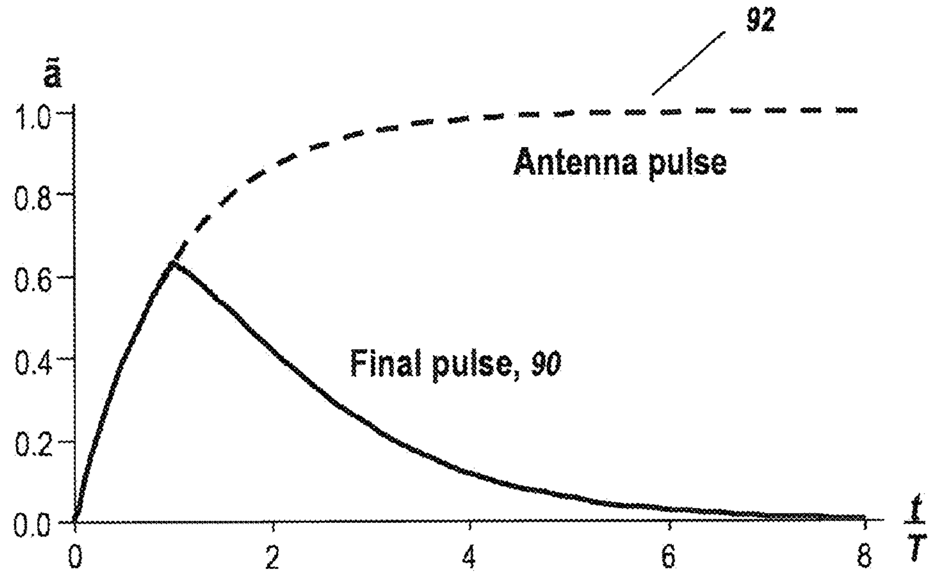
FIG. 18 is a graph showing ground response time as a function of antenna length and ground conductivity for the purpose of designing the optimal pulse length; and, FIG. 19 is a diagrammatic illustration of one way of providing an antenna array at the surface of the ocean, showing the towing of parallel 2 meter long lines spaced by 10 meters to provide for the emission of the extreme low frequency ultra low frequency signals at the magnetic equator.

This is a critical point of the invention and states that if the HED is sited in locations where the ionospheric conductance is below 30 S, the virtual antenna will not contribute to any significant extent. If however is sited in the dip equator where Σ≈400-500 S, the power injected by the HED in the earth-ionosphere waveguide will be 2025 dB higher than locating at high latitudes such as Michigan. FIG. 17 shows the ionospheric conductance as a function of geomagnetic latitude. One can see clearly that only if the HED is located at geomagnetic latitudes lower than 30 degrees there will be an enhancement and the optimal location is in the vicinity of the dip equator. FIG. 18 shows the geographic locations that correspond to high conductance values.

4. Vertical Electric Dipole (VED) Generation in ACE

A recent paper (Eliasson and Papadopoulos, Journal of Geophysical Research, 114, A10301, 2009) found that in addition to the horizontal virtual moment $I_v L_v$ the incident $E_h$ in the dip equator generates a VED due to leakage current across the horizontal magnetic field (FIG. 16). What is shown in FIG. 16 is as follows:

HED excitation of near electric fields at the E-region is driven by a sinusoidal current in the dip equator. The E-field drives a horizontal and a vertical current resulting in virtual HED and VED moments in the ionosphere. However, the fields at h=100 km are due to the superposition of the antenna current and its opposite current flowing through the ground resulting in the small ($\delta_{eff}$/h) factor in equations (12) and (15).

Depending on the E-region condition the value of the VED moment $p_v$ is approximately $$p_v \approx 0.2 I_v L_v = 0.2(IL)(\Sigma/30S)(\delta/h) \qquad (15)$$

Such a VED will generate isotropic radiation in the waveguide and thus send signals to regions that otherwise will not be covered. The amplitude of the electric field $E_v(\rho)$ in the far zone will be given by $$E_v(\rho) \approx 0.2(\Sigma/30S)Z_o(IL/h\sqrt{\lambda\rho})\alpha(\rho)(\delta/h) \approx\approx 3Z_o(IL/h\sqrt{\lambda\rho})\alpha(\rho)(\delta/h) \qquad (16)$$

In Equation (16) we used a value of 400 S for the conductance consistent with dip equator locations. The radiation from the induced in addition to isotropic coverage is by at least 20 dB larger than the one given by Equation (8).

4. ELF Generation by HED Using the Pulsed Artificially Constructed Electrojet (PACE) Concept—Sneak-Through Concept Further efficiency improvement can be accomplished by using a pulsed system to drive the magnetic field and the associated electric field at the reference altitude of 100 km. Referring to the previous section we note that the value of the electric field at the reference altitude is given by the second of Equations (12). Notice the presence of the factor δ/h that reduces the value of the induced electric field by a factor of 100. The physical origin of this factor is the radiation due to ground return. Namely, it is due to the fact that the fields at an altitude h are due to two anti-parallel currents, the antenna current and the ground return located a distance $\delta_{eff}$ further than the antenna current from the ionosphere that tend to cancel each other. The value of $\delta_{eff}$ is given by $$\delta_{eff} = \frac{L\delta}{2(L+\delta)} \qquad (17)$$

A key aspect of the invention is the "Sneak-Through" concept. The concept utilizes pulsed currents with rise times shorter or comparable than the time of the ground response T so that the radiation field sneaks-through to the ionosphere ahead of the canceling field due to the ground return. By ground response we mean the time that it takes for the fields radiated by the ground currents to reach the surface. Given that the propagation through the ground is diffusive, the response time is given by $$T \square 2\mu_o \sigma \delta_{eff}^2 \square 2\mu_o \sigma L^2 \qquad (18)$$

The sneak-through effect is shown in FIG. 18. A current pulse of the form 1-exp(−t/T) gives rise to the electric field shown by the red line in FIG. 18. It is composed from the original pulse due to the antenna current (black line) minus the field from the ground return. The waveform of the ground return is similar to the antenna but delayed by time equal to $\sqrt{t}$. This time dependence is consistent with the fact that the equivalent propagation velocity through the ground is given by $$v = 1/\sqrt{2\mu_o \rho t} \qquad (19)$$

Figure 19:
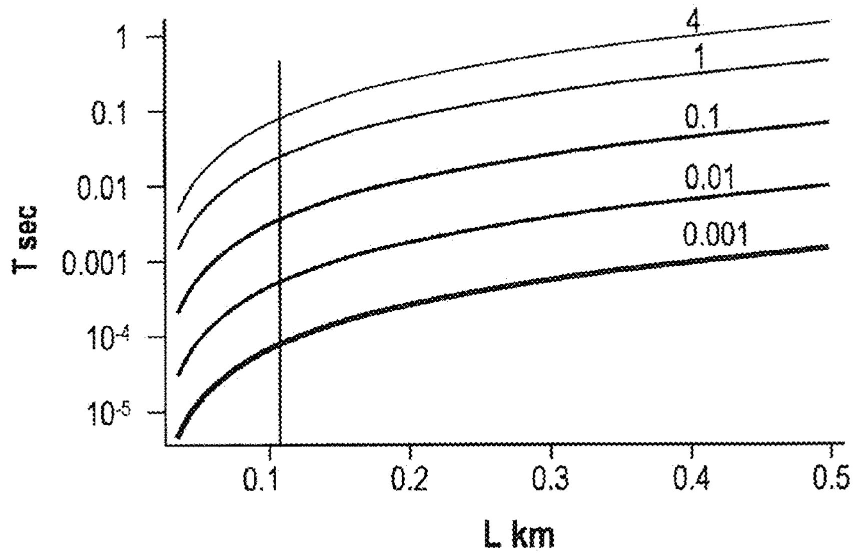

As shown in FIG. 18 the reduction of the pulse amplitude due to the return current is less than a factor of two. Pulses with shorter rise times have larger relative amplitudes, while pulses with rise times longer than T approach asymptotically the steady state result. The value of T depends on the ground conductivity and the antenna length L. The scaling of T with L and ρ is shown in FIG. 19. One can see that for values of L of few hundred meters pulses from milliseconds to several seconds can be driven.

As a result of the sneak-through the value of the magnetic fields at the reference altitude will be given by $$E_v(h) = g\frac{IL}{4\pi\varepsilon_o ch^2}f(t) \simeq g\frac{IL}{30h^2}f(t) \qquad (20)$$

In equation (20) g is a factor of order 0.5 as seen from FIG. 4 and f(t) is the pulse shape. From Equations (12) we find that in this case $$I_v L_v \approx gIL(\Sigma/30S) \qquad (21)$$

As a result using sneak-through will further enhance the amplitude by a factor g(h/δ) adding an additional 15-25 dB as well as extend the radiation to auroral locations.

Figure 20:
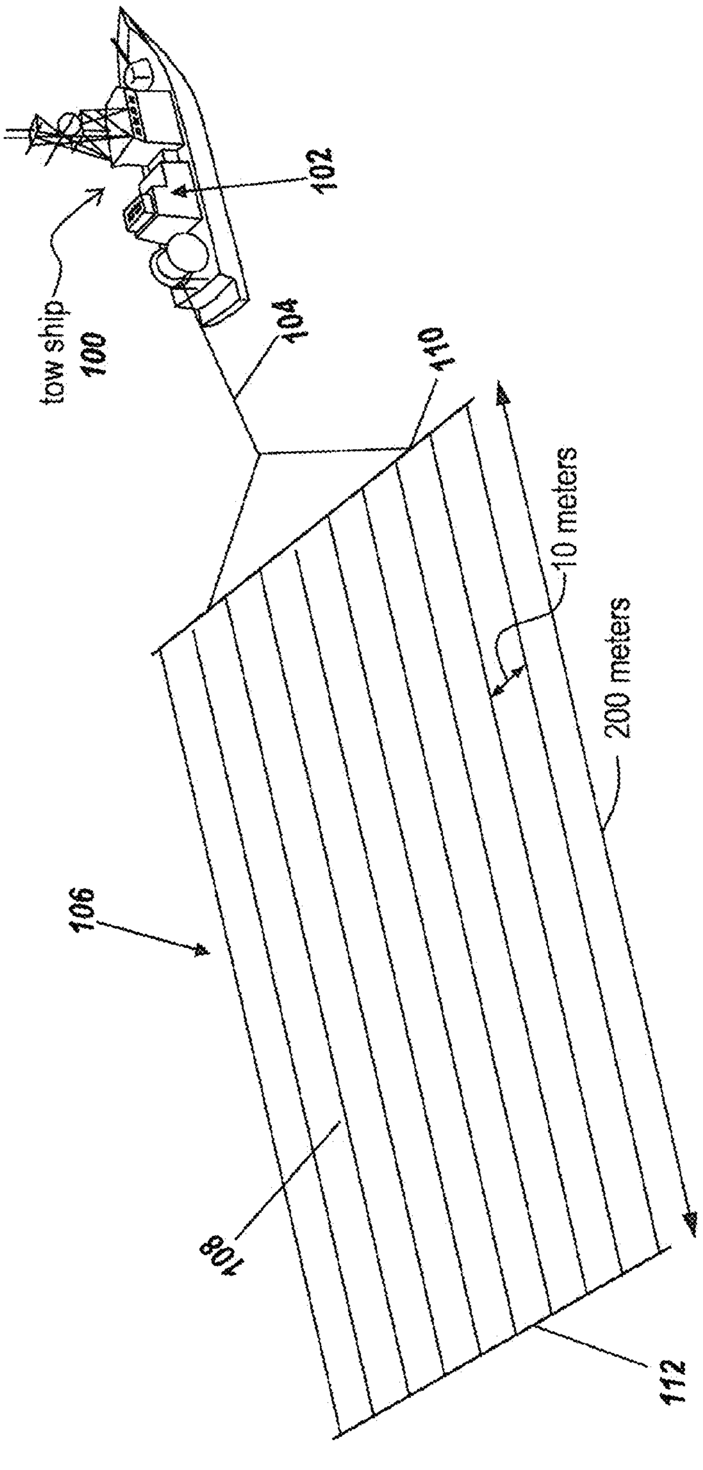
FIG. 20 is a top plan view showing it is convenient to provide a towed antenna array in the magnetic equatorial regions.

Referring now to FIG. 20, it is convenient to provide a towed antenna array in the magnetic equatorial regions.

As shown in FIG. 20, a tow ship 100 carrying ground-based ELF generation equipment 102 has the ELF generated signal applied through a towing cable 104 to an array 106 of parallel lines 108. These lines are spaced by 100 meters and in one embodiment 200 meters in length. The spacing of these lines is maintained by a transverse member 110 at the head of the array and a transverse member 112 at the ends of the lines. The lines may be stretched by attaching a drogue (not shown) to 112 or by using the traditional doors that are used by commercial fishermen in deploying their nets or lines.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A method for generating electromagnetic waves in the ELF/ULF comprising the step of:

using a ground-based horizontal electric dipole antenna to send electromagnetic pulses upwardly in the E-region of the ionosphere to form an oscillatory or pulsed electric field, the oscillatory or pulsed electric field interacting with magnetized plasma of the lower ionosphere to generate oscillatory or pulsed horizontal and vertical currents which have an associated electric dipole moment, the oscillatory or pulsed horizontal and vertical currents radiating in the earth-ionosphere waveguide.

2. The method of claim 1, wherein the ground-based horizontal electric dipole antenna is located at a location close to the magnetic equator to take advantage of the large ionospheric conductance.

3. The method of claim 1, wherein the electromagnetic pulses sent by the ground-based horizontal electric dipole antenna have millisecond to second durations.

4. The method of claim 3, wherein the electromagnetic pulses have electric field amplitudes larger than 0.1m V/m at a 100 km height.

5. The method of claim 1, wherein the oscillatory or pulsed horizontal and vertical currents have electric moments that exceed $1\times10^7$ A-m.

6. The method of claim 1, wherein a vertical electric dipole in the earth-ionosphere that is generated as a result of the ground-based pulses radiates isotropically with a magnetic field amplitude on the order of nano-Tesla at a distance of 1000 km from a source.

7. Apparatus for communicating from a ground-based transmitter at extra low frequencies to a receiver, comprising;

a ground-based transmitter having an antenna located near the magnetic equator of the earth, said transmitter transmitting extremely low frequency signals to said receiver, whereby the signal strength at said receiver is stronger than that associated with signals from an identical ground-based transmitter located at high geomagnetic latitudes.

8. The apparatus of claim 7, wherein said receiver is a subsurface receiver, whereby the received extra low frequency signals are detected at a significant distance from the surface due to the magnitude of said received extra low frequency signals.

9. The apparatus of claim 8, wherein said subsurface receiver is located in a sub-sea location.

10. The apparatus of claim 8, wherein said subsurface receiver is located in a subterranean location.

11. The apparatus of claim 8, and further including a submarine, said sub-sea receiver located on said submarine.

12. The apparatus of claim 7, and further including a detector for detecting signals returned from subsurface objects.

13. The apparatus of claim 12, wherein said detector is located above the surface of the earth.

14. The apparatus of claim 13, and further including a unit coupled to said detector for imaging said subsurface objects.

15. The apparatus of claim 7, and further including a module for modulating said signals from said ground-based transmitter to provide pulses, the length of said pulses being less than the delay associated with a ground return pulse, whereby said ground return pulse is not effective in reducing corresponding signals from the ionosphere, whereby signals received at said receiver are between 15 to 20 dB stronger than signals that are not pulsed.

16. The apparatus of claim 15, wherein the length of said pulses depends on the length of said antenna and the ground conductivity at said antenna.

17. The apparatus of claim 7, wherein signals received at said receiver are 25 to 30 dB higher than those associated with an identical ground-based transmitter at higher altitudes.

18. Apparatus for communicating from a ground-based transmitter at extra low frequencies to a receiver, comprising:

a ground-based transmitter having an antenna located near the magnetic equator of the earth, said transmitter transmitting extremely low frequency signals to said receiver, whereby the strength of said signals at said receiver is stronger than that associated with signals from an identical ground-based transmitter located at high geomagnetic latitudes, wherein said receiver is a subsurface receiver located in a subterranean location, whereby the received extra low frequency signals are detected at a significant distance from the surface due to the magnitude of said received extra low frequency signals.

19. The apparatus of claim 18, and further including a submarine.

20. The apparatus of claim 19, and further including a sub-sea receiver located on said submarine.

21. The apparatus of claim 18, and further including a detector for detecting signals returned from subsurface objects.

22. The apparatus of claim 21, wherein said detector is located above the surface of the earth.

23. The apparatus of claim 22, and further including a unit coupled to said detector for imaging said subsurface objects.

24. The apparatus of claim 18, and further including a module for modulating said signals from said ground-based transmitter to provide pulses, the length of said pulses being less than the delay associated with a ground return pulse, whereby said ground return pulse is not effective in reducing corresponding signals from the ionosphere, whereby signals received at said receiver are between 15 to 20 dB stronger than signals that are not pulsed.

25. The apparatus of claim 24, wherein the length of said pulses depends on the length of said antenna and the ground conductivity at said antenna.

26. The apparatus of claim 18, wherein signals received at said receiver are 25 to 30 dB higher than those associated with an identical ground-based transmitter at higher altitudes.

27. Apparatus for communicating from a ground-based transmitter at extra low frequencies to a receiver, comprising:

a ground-based transmitter having an antenna located near the magnetic equator of the earth, said transmitter transmitting extremely low frequency signals to said receiver, whereby the signal strength at said receiver is stronger than that associated with signals from an identical ground-based transmitter located at high geomagnetic latitudes, wherein said receiver is a sub-sea receiver, whereby the received extra low frequency signals are detected at a significant distance from the surface due to the magnitude of said received extra low frequency signals, and further including a submarine, said sub-sea receiver located on said submarine.

* * * * *